(12) United States Patent
Yang

(10) Patent No.: US 7,859,200 B2
(45) Date of Patent: Dec. 28, 2010

(54) MUTUALLY CROSS-INTERLOCKED MULTIPLE ASYNCHRONOUS AC INDUCTION ELECTRICAL MACHINES

(76) Inventor: Tai-Her Yang, 6F-5, No. 250, Sec. 4, Chung Hsiao E. Rd., Taipei (TW) 10692

( * ) Notice: Subject to any disclaimer, the term of this patent is extended or adjusted under 35 U.S.C. 154(b) by 349 days.

(21) Appl. No.: 12/219,476

(22) Filed: Jul. 23, 2008

(65) Prior Publication Data

US 2010/0019701 A1  Jan. 28, 2010

(51) Int. Cl.
    *H02K 17/36* (2006.01)
(52) U.S. Cl. .................. 318/34; 318/111; 318/112; 318/113; 318/93; 318/727; 310/195; 310/198
(58) Field of Classification Search ............... 318/34, 318/37, 41, 42, 44, 45, 47–50, 105, 111–113, 318/93–96, 727, 770, 832; 310/195, 198
    See application file for complete search history.

(56) References Cited

U.S. PATENT DOCUMENTS

| | | | | |
|---|---|---|---|---|
| 2,018,253 A | * | 10/1935 | Dapprich | 318/44 |
| 2,500,595 A | * | 3/1950 | Young et al. | 318/45 |
| 3,611,080 A | * | 10/1971 | Herzog et al. | 318/99 |
| 4,074,160 A | * | 2/1978 | Broadway | 310/184 |
| 4,208,620 A | * | 6/1980 | Ringland | 318/111 |
| 4,532,458 A | * | 7/1985 | Kuznetsov et al. | 318/111 |
| 5,629,596 A | * | 5/1997 | Iijima et al. | 318/762 |
| 6,373,204 B1 | * | 4/2002 | Peterson et al. | 318/41 |
| 2009/0033251 A1 | * | 2/2009 | Perisic et al. | 318/105 |
| 2009/0058335 A1 | * | 3/2009 | Kascak et al. | 318/400.02 |
| 2010/0148616 A1 | * | 6/2010 | Yang | 310/195 |
| 2010/0148617 A1 | * | 6/2010 | Yang | 310/195 |
| 2010/0148716 A1 | * | 6/2010 | Yang | 318/767 |
| 2010/0148717 A1 | * | 6/2010 | Yang | 318/767 |

FOREIGN PATENT DOCUMENTS

| | | | |
|---|---|---|---|
| JP | 56001796 A | * | 1/1981 |
| JP | 58123397 A | * | 7/1983 |
| JP | 06261598 A | * | 9/1994 |

* cited by examiner

*Primary Examiner*—Walter Benson
*Assistant Examiner*—Eduardo Colon-Santana
(74) *Attorney, Agent, or Firm*—Bacon & Thomas, PLLC

(57) ABSTRACT

For mutually cross-interlocked multiple asynchronous AC induction electrical machines of the present invention, wherein the applicable operating characteristic curves of the asynchronous AC induction electrical machines include the asynchronous AC induction electrical machine of various operating characteristics, wherein when they are provided for the individual operation in different loading conditions, it is characterized that the cross interlocked electrical machine can be used to increase or decrease the rotational speed of the individual operation.

7 Claims, 1 Drawing Sheet

MUTUALLY CROSS-INTERLOCKED MULTIPLE ASYNCHRONOUS AC INDUCTION ELECTRICAL MACHINES

BACKGROUND OF THE INVENTION (a) Field of the Invention

The present invention innovatively discloses that the first asynchronous AC induction electrical machine is installed with main winding and control winding on its magnetic field, wherein main winding is the main driving winding on the rotor of the asynchronous AC induction electrical machine, while its control winding is series connected with the main winding of the neighboring second asynchronous AC induction electrical machine, the control winding and the electrical machine's own main winding are installed at the same polar axis, or on the axis with electrical angle difference, wherein the two can be selected according to operating performance requirements as 1) combination for assisting excitation at same polarities, or 2) combination at opposite polarities for differential excitation, while the control winding being relatively installed on the second asynchronous winding induction electrical machine and the main winding of the first electrical machine winding appear to be wound on the same polar axis or on the axis with electrical angle difference, wherein the two can be selected according to operating performance requirements as 1) combination for assisting excitation at same polarities, or 2) combination at opposite polarities for differential excitation.

(b) Description of the Prior Art

When the conventional multiple asynchronous AC induction electrical machines being operated for motor or generator functions in parallel connection, each electrical machine is operated independently without mutual affections or interactions for particular performance.

SUMMARY OF THE INVENTION

The present invention innovatively discloses that the first asynchronous AC induction electrical machine is installed with main winding and control winding on its magnetic field, wherein main winding is the main driving winding on the rotor of the asynchronous AC induction electrical machine, while its control winding is series connected with the main winding of the neighboring second asynchronous AC induction electrical machine, the control winding and the electrical machine's own main winding are installed at the same polar axis, or on the axis with electrical angle difference, wherein the two can be selected according to operating performance requirements as 1) combination for assisting excitation at same polarities, or 2) combination at opposite polarities for differential excitation, while the control winding being relatively installed on the second asynchronous winding induction electrical machine and the main winding of the first electrical machine winding appear to be wound on the same polar axis or on the axis with electrical angle difference, wherein the two can be selected according to operating performance requirements as 1) combination for assisting excitation at same polarities, or 2) combination at opposite polarities for differential excitation.

DESCRIPTION OF MAIN COMPONENT SYMBOLS

Figure 1:
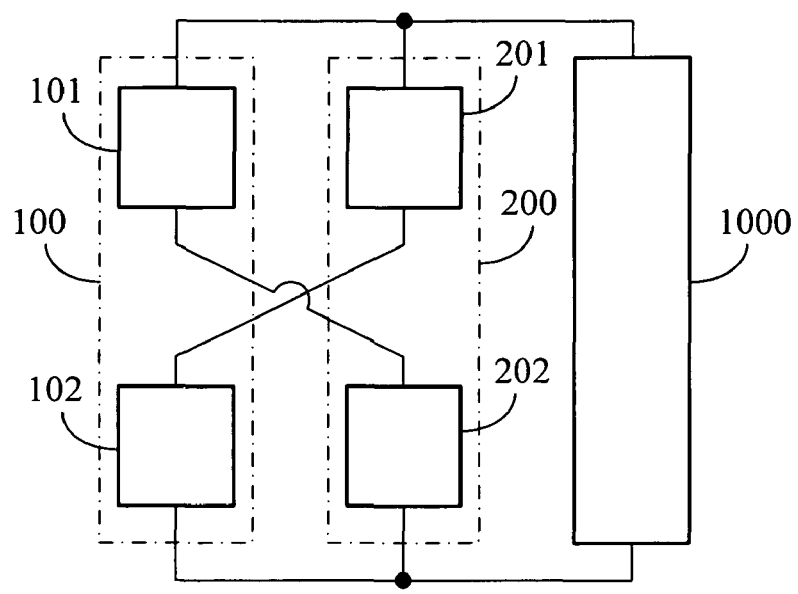
FIG. 1 is a structural schematic view of the mutually cross-interlocked multiple asynchronous AC induction electrical machines of the present invention being constituted by two asynchronous AC induction electrical machines.

100: First electrical machine
101: The main winding of first electrical machine
102: The control winding of first electrical machine
200: Second electrical machine
201: The main winding of second electrical machine
202: The control winding of second electrical machine
300: Third electrical machine
301: Main winding of third electrical machine
302: Control winding of third electrical machine
1000: AC power source

DETAILED DESCRIPTION OF THE PREFERRED EMBODIMENTS

The principle of the present invention is described as follows. FIG. 1 is a structural schematic view of the mutually cross-interlocked multiple asynchronous AC induction electrical machines of the present invention being constituted by two asynchronous AC induction electrical machines.

For the mutually cross-interlocked circuit being powered by AC power source (1000) in operation as shown in FIG. 1, if current is changed following load variation of the first electrical machine (100), then excited current on the control winding (202) of the second electrical machine being series connected with the main winding (101) of first electrical machine (100) is also changed simultaneously, and the combined magnetic flux between the main winding (201) and the control winding (202) installed to the second electrical machine's (200) own magnetic field is also varied accordingly affected by their installation relationships between self-field polarities, polar axis electrical angle positions, and phases of excited current, etc., so that beside of the adjustment following its own load change, torque and rotational speed of the second electrical machine (200) are also adjusted following the load change of the first electrical machine (100) being series connected with its control winding (202); on the contrary, if current is changed following load variation of the second electrical machine (200), then excited current on the control winding (102) installed on the first electrical machine (100) and being series connected with the main winding (201) of the second electrical machine (200) is also changed simultaneously, and the combined magnetic flux between the main winding (101) and the control winding (102) installed to the first electrical machine's (100) own magnetic field is also varied accordingly affected by their installation relationships between self-field polarities, polar axis electrical angle positions, and phases of excited current, etc., so that beside of the adjustment following its own load change, torque and rotational speed of the first electrical machine (100) are also adjusted following the load change of the second electrical machine (200) being series connected with its control winding (102).

Figure 2:
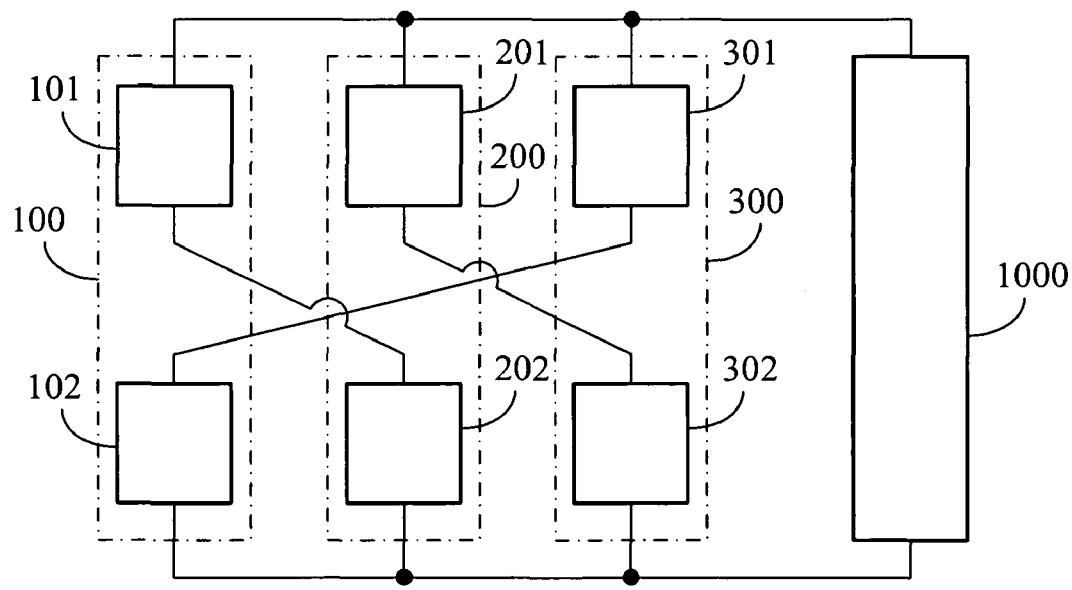
FIG. 2 is a structural schematic view of the mutually cross-interlocked multiple asynchronous AC induction electrical machines of the present invention being constituted by three asynchronous AC induction electrical machines.

Same principle as above said can be applied for the occasion of three electrical machines, such as that FIG. 2 is a structural schematic view of the mutually cross-interlocked multiple asynchronous AC induction electrical machines of the present invention being constituted by three asynchronous AC induction electrical machines. As shown in FIG. 2, the first electrical machine (100) is installed with its own main winding (101) on the magnetic field thereof and is installed with a control winding (102) being series connected with the main winding (301) of the third electrical machine (300) on the same polarity axis or the axis of electrical angle difference; the second electrical machine (200) is installed with its own main winding (201) on the magnetic field thereof and is installed with a control winding (202) being series connected with the main winding (101) of the first electrical machine (100) on the same polarity axis or the axis of electrical angle difference; and the third electrical machine (300) is installed with its own main winding (301) on the magnetic field thereof and is installed with a control winding (302) being series connected with the main winding (201) of the second electrical machine (200) on the same polarity axis or the axis of electrical angle difference; wherein it is through the particular combination status between the main windings (101, 201, 301) and the control windings (102, 202, 302) of the three electrical machines to generate the semi-cross-interlocked operating characteristics in the course of operation driven by AC power source (1000), and said guidelines and principles can be similarly deduced when the number of electrical machines is increased.

In practical applications for the mutually cross-interlocked multiple asynchronous AC induction electrical machines of the present invention, the following functions can be combined according to operating function requirements to include the applications of 1) being operated for asynchronous AC induction electromotor function; or 2) being operated for asynchronous AC induction generator function; or 3) being operated for partial asynchronous AC induction generator function and partial asynchronous AC induction electromotor function.

For the mutually cross-interlocked multiple asynchronous AC induction electrical machines of the present invention, wherein the excitation relationships between the individual main windings and the control windings of each electrical machines include the following:

1) All electrical machines have their own main winding and control winding being installed at same polarities; or
2) All electrical machines have their own main winding and control winding being installed at opposite polarities; or
3) Partial electrical machines having their own main winding and control winding being installed at same polarities and partial electrical machines having their own main winding and control winding being installed at opposite polarities.

For the mutually cross-interlocked multiple asynchronous AC induction electrical machines of the present invention, the main winding and control winding of each individual electrical machine can be installed at the same polar axis, or installed at axis with electrical angle difference, wherein the installation with electrical difference can be varied by changing the shape of magnetic field being constructed together with the main magnetic field via current passing through the control winding.

The power source ends of the mutually cross-interlocked multiple asynchronous AC induction electrical machines of the present invention are parallel connected and are driven simultaneously by AC electric power source or their rotational speeds, or torques, or rotational directions are commonly operatively controlled by control frequency, control voltage, or the control frequency and control voltage simultaneously.

The invention claimed is:

1. The mutually cross-interlocked multiple asynchronous AC induction electrical machines is that the first asynchronous AC induction electrical machine is installed with main winding and control winding on its magnetic field, wherein main winding is the main driving winding on the rotor of the asynchronous AC induction electrical machine, while its control winding is series connected with the main winding of the neighboring second asynchronous AC induction electrical machine, the control winding and the electrical machine's own main winding are installed at the same polar axis, or on the axis with electrical angle difference, wherein the two can be selected according to operating performance requirements as 1) combination for assisting excitation at same polarities, or 2) combination at opposite polarities for differential excitation, while the control winding being relatively installed on the second asynchronous winding induction electrical machine and the main winding of the first electrical machine winding appear to be wound on the same polar axis or on the axis with electrical angle difference, wherein the two can be selected according to operating performance requirements as 1) combination for assisting excitation at same polarities, or 2) combination at opposite polarities for differential excitation.

2. The mutually cross-interlocked multiple asynchronous AC induction electrical machines as claimed in claim 1, wherein when being powered by AC power source (1000) in operation, if current is changed following load variation of the first electrical machine (100), then excited current on the control winding (202) of the second electrical machine being series connected with the main winding (101) of first electrical machine (100) is also changed simultaneously, and the combined magnetic flux between the main winding (201) and the control winding (202) installed to the second electrical machine's (200) own magnetic field is also varied accordingly affected by their installation relationships between self-field polarities, polar axis electrical angle positions, and phases of excited current, etc., so that beside of the adjustment following its own load change, torque and rotational speed of the second electrical machine (200) are also adjusted following the load change of the first electrical machine (100) being series connected with its control winding (202); on the contrary, if current is changed following load variation of the second electrical machine (200), then excited current on the control winding (102) installed on the first electrical machine (100) and being series connected with the main winding (201) of the second electrical machine (200) is also changed simultaneously, and the combined magnetic flux between the main winding (101) and the control winding (102) installed to the first electrical machine's (100) own magnetic field is also varied accordingly affected by their installation relationships between self-field polarities, polar axis electrical angle positions, and phases of excited current, etc., so that beside of the adjustment following its own load change, torque and rotational speed of the first electrical machine (100) are also adjusted following the load change of the second electrical machine (200) being series connected with its control winding (102).

3. The mutually cross-interlocked multiple asynchronous AC induction electrical machines as claimed in claim 1, wherein it includes being constituted by three asynchronous AC induction electrical machines; wherein the first electrical machine (100) is installed with its own main winding (101) on the magnetic field thereof and is installed with a control winding (102) being series connected with the main winding (301) of the third electrical machine (300) on the same polarity axis or the axis of electrical angle difference; the second electrical machine (200) is installed with its own main winding (201) on the magnetic field thereof and is installed with a control winding (202) being series connected with the main winding (101) of the first electrical machine (100) on the same polarity axis or the axis of electrical angle difference;

and the third electrical machine (300) is installed with its own main winding (301) on the magnetic field thereof and is installed with a control winding (302) being series connected with the main winding (201) of the second electrical machine (200) on the same polarity axis or the axis of electrical angle difference; wherein it is through the particular combination status between the main windings (101, 201, 301) and the control windings (102, 202, 302) of the three electrical machines to generate the semi-cross-interlocked operating characteristics in the course of operation driven by AC power source (1000), and said guidelines and principles can be similarly deduced when the number of electrical machines is increased.

4. The mutually cross-interlocked multiple asynchronous AC induction electrical machines as claimed in claim 1, wherein the following functions can be combined according to operating function requirements to include the applications of 1) being operated for asynchronous AC induction electromotor function; or 2) being operated for asynchronous AC induction generator function; or 3) being operated for partial asynchronous AC induction generator function and partial asynchronous AC induction electromotor function.

5. The mutually cross-interlocked multiple asynchronous AC induction electrical machines as claimed in claim 1, wherein the excitation relationships between the individual main windings and the control windings of each electrical machines include the following:

1) All electrical machines have their own main winding and control winding being installed at same polarities; or
2) All electrical machines have their own main winding and control winding being installed at opposite polarities; or
3) Partial electrical machines having their own main winding and control winding being installed at same polarities and partial electrical machines having their own main winding and control winding being installed at opposite polarities.

6. The mutually cross-interlocked multiple asynchronous AC induction electrical machines as claimed in claim 1, wherein the main winding and control winding of each individual electrical machine can be installed at the same polar axis, or installed at axis with electrical angle difference, wherein the installation with electrical difference can be varied by changing the shape of magnetic field being constructed together with the main magnetic field via current passing through the control winding.

7. The mutually cross-interlocked multiple asynchronous AC induction electrical machines as claimed in claims 1, 2 or 3, wherein the power source ends thereof are parallel connected and are driven simultaneously by AC electric power source or their rotational speeds, or torques, or rotational directions are commonly operatively controlled by control frequency, control voltage, or the control frequency and control voltage simultaneously.

* * * * *